United States Patent Office 2,763,200
Patented Sept. 18, 1956

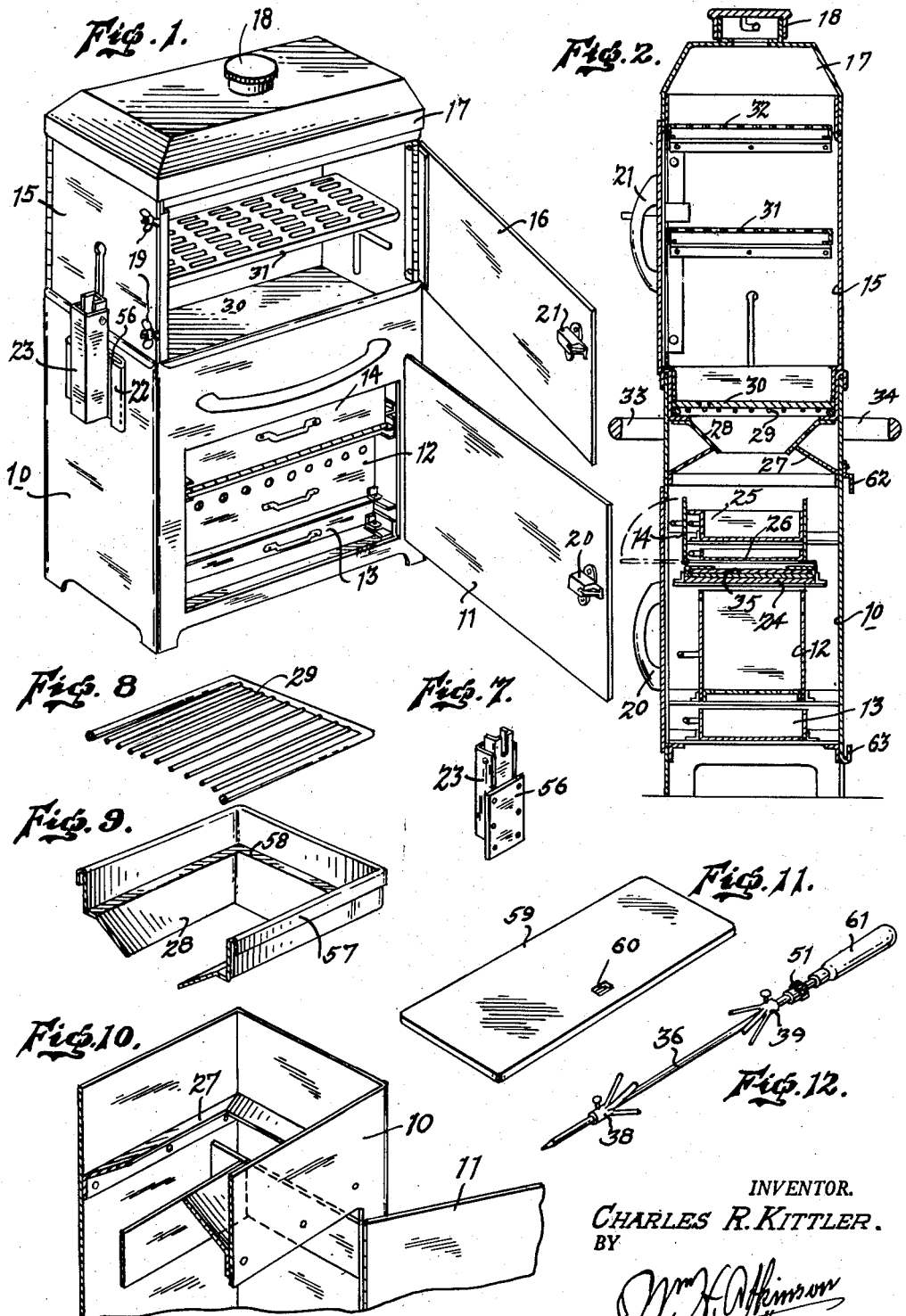

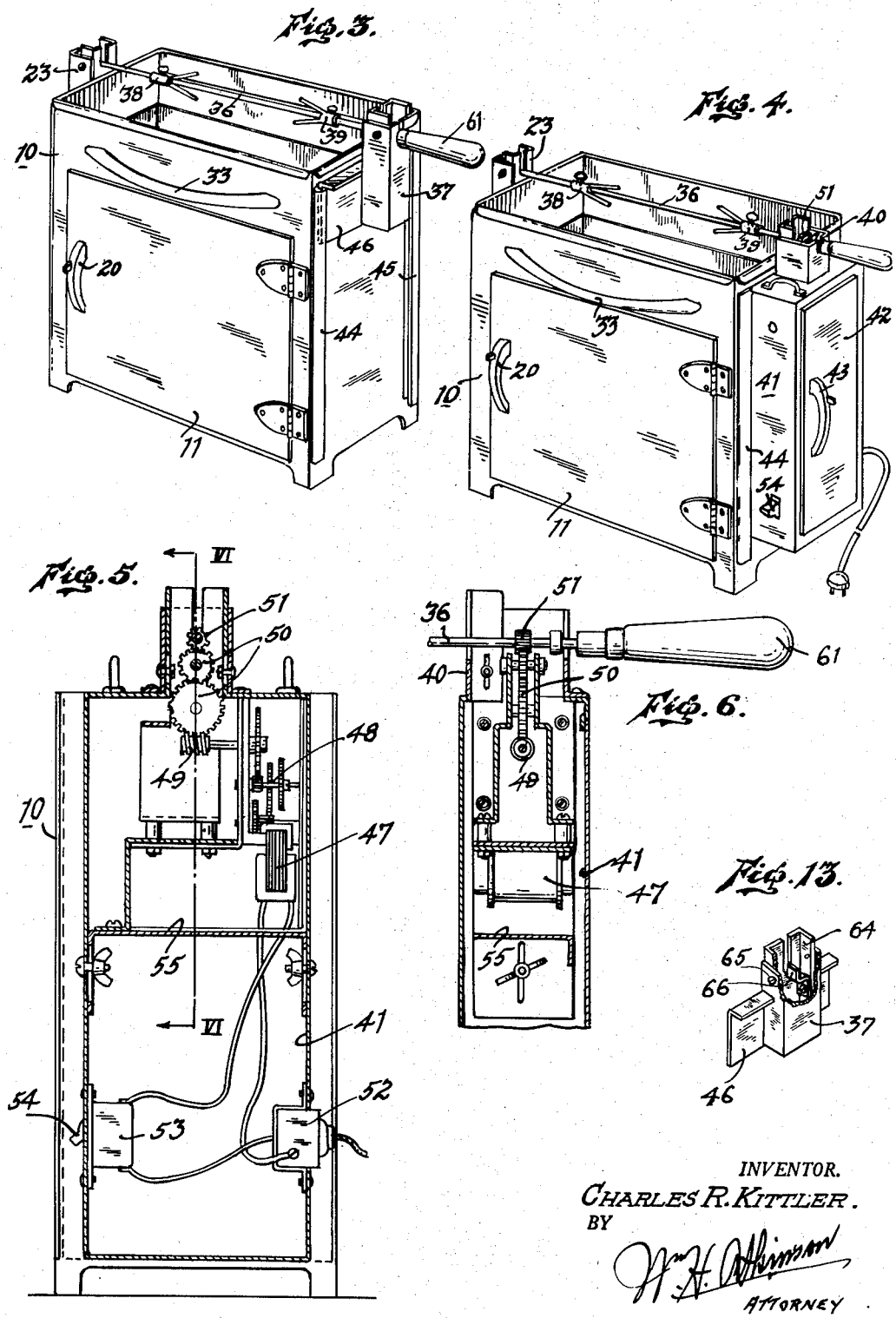

2,763,200

CHARCOAL BARBECUE

Charles R. Kittler, San Francisco, Calif.

Application August 21, 1953, Serial No. 375,739

3 Claims. (Cl. 99—446)

My present invention relates to a food preparing apparatus and more particularly to a new and improved portable charcoal burning barbecue unit for the preparation of food.

An object of my invention is to provide a food preparing stove employing charcoal as a fuel upon which food may be fried, grilled, barbecued or roasted.

Another object of my invention is to provide a unit of the above character having novel features which render the apparatus smokeless and therefore capable of use in a confined space such as the living room of a residence.

Another object of the invention is to provide a barbecue unit having interchangeable and demountable skewer supporting means for either manual or motor driven operation that is adaptable for storage within the unit when not in use.

Another object of the invention is to provide a device of the above character with a novel heat conducting flue having grease entrapping features that will eliminate smoke when barbecuing meats and poultry.

Other objects and advantages of the invention will be in part evident to those skilled in the art and in part pointed out hereinafter in connection with the accompanying drawing wherein there is shown by way of illustration and not of limitation a preferred embodiment thereof.

In the drawings:

Figure 1 is a perspective view showing my device with two of its doors open to reveal the interior arrangement.

Figure 2 is a vertical sectional view taken centrally through the device as illustrated in Fig. 1 of the drawings.

Figure 3 is a perspective view showing my device set up for a barbecue with a manually operated spit.

Figure 4 is a view similar to Fig. 3 showing my device equipped with an electric motor drive for the skewer.

Figure 5 is a vertical sectional view of the motor drive unit shown in Fig. 4 of the drawings.

Figure 6 is a fragmentary sectional view taken along line VI—VI of Fig. 5 looking in direction of arrows.

Figure 7 is a perspective view of a removable skewer supporting bearing of the type shown in Figs. 3 and 4 of the drawings.

Figures 8, 9 and 10, represent exploded perspective views of the parts which constitute the heat conducting flue and grill of my device.

Figure 11 is a perspective view of a skillet plate, and

Figure 12 is a perspective view of a skewer adapted for use with my improved stove, and Figure 13 is a perspective view of the spit supporting member shown in Fig. 3, with portion broken away to reveal a detail thereof.

In carrying out my invention, as illustrated in Fig. 1 of the drawings, I provide a rectangular housing 10 that is open at its bottom and along one side. Upon the side of the housing 10 there is a door 11 by which the side opening of the housing may be closed. Mounted within the housing 10 and removable through the side opening there is a fire box 12 below which and in space relation there is also a removable ash pan 13. Immediately above the fire box 12, as will hereinafter appear, there is a flash plate that serves to distribute the heat generated in the fire box 12 which, in the preferred arrangement, will be charged with charcoal. Above this flash plate and operating within the housing 10 there is a hinged door 14 which conceals two slideably mounted grease collecting drip pans, the nature and operation of which will be hereinafter described. As indicated in this figure of the drawings, my improved stove is adapted for barbecuing, roasting and the baking of various foods. To this end the housing 10 is here shown as having an upwardly extending oven forming means 15 which is comprised of two end plates, a back plate and a front door 16 which are all hinged together as a unit. This means 15 is dimensioned to telescope within the open upper end of the housing 10 and at its top it is provided with a removable cover 17, that has a vent 18 for the escape of hot gases. When assembled upon the housing 10 in this manner the hinged oven forming means 15 are secured by wing nuts 19. As here shown it will be noted that the doors 11 and 16 of the housing 10 and oven portion are provided with snap latches 20 and 21 by which they are held in their closed position when the device is in operation. At the exposed end of the housing 10 there is a tapered cleat-like member 22 into which there is mounted suitable spit supporting member 23 that is adapted to support the free end of the spit.

Upon now referring to Fig. 2 of the drawings, which is a vertical sectional view of the complete assembly, it will be noted that the fire box 12 and the ash pan 13 are positioned centrally within the housing so that the heat from the fire box 12 will flow upwardly and around a flash plate, here designated by the numeral 24, and also a main drip pan 25 and an auxiliary drip pan 26 which, as hereinbefore indicated, are concealed behind the door 14.

In the upper portion of the housing 10 there is a flue forming member 27 having inwardly inclined and upwardly extending walls which, in cooperation with downwardly extending and inwardly inclined walls of the flue forming member 28, forms a flue through which the heat from the fire box 12 is concentrated in that part of the housing where a grate 29 is located. In this assembly I have also shown a skillet forming plate 30 that may be used optionally in lieu of the grill 29. The plate 30 will be also employed where a device is used for baking. In this figure of the drawing the oven forming means 15 are shown as having slide-ways upon which there may be mounted two shelves 31 and 32 upon which food to be baked may be placed, or these shelves may be employed as a warming closet where it is desired to keep heated food in a servable condition. At the side of the housing 10 near its upper rim there are two elongated handles 33 and 34 by which the unit may be handled and moved from one place to another.

Before passing on to the remaining figures of the drawings it should be here pointed out that the flash plate 24 is provided with a heat insulating layer of asbestos 35, which serves to prevent overheating of the drip pans 25 and 26 which, as is well understood, accounts for most of the smoke generally present in the barbecuing of meats and the like where the drippings are permitted to fall down on the fire. As a result of this provision it is possible to barbecue indoors without objectional smoke and odors.

In Figs. 3 and 4 of the drawings the device is shown with the oven forming means 15 removed. In these showings a spit 36 is mounted with its free end in the support 23 and at its other end there is a substantially similar support 37 that is likewise removable from the housing 10. With this arrangement it will be understood that the spit 36 is turned by hand and to secure the article being barbecued thereon the spit 36 carries two slideable forked clamps 38 and 39 that are adapted to be secured against opposite ends of an article of food placed thereupon in the manner well understod in the art. In Fig. 4, the spit 36 is shown as mounted at its handle bearing end upon a support 40 which, as will presently appear, is associated with a removable cabinet 41 that carries a motor drive for rotating the spit 36. This cabinet 41 is provided with a door 42 which is secured by a latch-like handle 43 and at its back the housing 41 is provided with vertical flanges by which it is mounted between two flanged guide members 44 and 45 in the manner similar to that prevailing in connection with the spit supporting member 37 which, as shown in Fig. 3, is provided with a wide flange engaging plate 46 by which it is secured upon the housing 10 between the flanged guide members 44 and 45.

As more clearly shown in Figs. 5 and 6 of the drawings, the housing 41 carries an electric motor 47 that is adapted through a chain of gears 48, a worm gear 49 and a series of gears 50 to rotate the spit 36. In this arrangement the upper one of the series of gears 50 is adapted to be engaged by a pinion 51 carried by the spit 36. When the spit 36 is positioned upon the housing 10 with its pinion 51 in engagement with the gears 50 it will be turned at a speed that will be determined by the speed of the electric motor 47. In its lower portion the housing 41 is shown as having a plug-in receptacle 52 through which connection may be made with an ordinary household outlet and at its other side this housing carries a circuit control switch 53 which has an exposed toggle 54 by which the circuit of the motor 47 is controlled. It will be here noted that the motor 47 is mounted upon an adjustable shelf 55 so that the height of the spit 36 above the fire may be regulated as required by adjusting the motor and drive to the proper height.

In Fig. 7 of the drawings it will be noted that the spit supporting member 23, like the motor housing 41 and the support 37, is provided with a plate-like back portion 56 which is adapted to be positioned in a flanged clamping plate 22 and is mounted upon this end of the housing 10. In this manner the spit supporting members 23 and 37 and the motor controlling housing 41 are made removable from the housing 10 so that they can be stored within the housing 10 when the stove is disassembled for transportation.

As indicated above, a feature of my device is the ease with which it can be assembled and disassembled for transportation and/or storage. In order to render it possible to maintain the parts in a clean and sanitary condition, I have also shown the downwardly extending and inwardly inclined flue forming member 28 and the grill 29 as removable, so that the interior of the housing above the grease pans 25 and 26 can be thoroughly and conveniently cleaned. This feature is more clearly illustrated by the fragmentary views, Figs. 8, 9 and 10, which are arranged in superimposed relation to indicate their relationship with respect to each other. In these showings it will be noted the walls of the housing 10 are single thickness about their upper edges and that the downwardly inclined flue forming member 28 is provided with a downwardly depending flange 57 that extends completely therearound and by which it is secured upon the housing 10 in cooperating relation with the upwardly and inwardly extending flue forming member 27. The member 28 is also here shown as having a shouldered portion 58 upon which the grill 29 or the hot plate 30 are adapted to rest when in use.

In Fig. 11 there is shown a grill plate 59 that may be substituted for the open grill 29 where it is desired to perform a cooking operation for which the grill 29 is not suitable. In this manner the grill plate 59 may be used in lieu of a frying pan. This grill plate 59 has a recess 60 for an ordinary stove lid lifter which may be used for removal when hot.

In Fig. 12 of the drawings the spit 36, with its forked members 38 and 39, is shown as pointed at one end and as carrying the pinion 51 for motor operation. This end of the spit also carries a heat insulated handle 61 by which this spit may be handled in removing and placing the article to be barbecued in operating relationship over the heat directing flue formed by the members 27 and 28.

In Fig. 13 there is illustrated a further detail of my invention which is considered novel in connection with the spit 36 when used with manual manipulation. As shown in Fig. 3 of the drawings the spit 36 is disposed between the two supports 23 and 27 which are detachably attached to the end walls of the housing 10 and project upwardly so as to dispose the spit 36 longitudinally thereabove. As explained, the supports 23 and 37 are vertically adjustable and when the spit is mounted thereupon by disposing its handled end in the vertical slot of the adjustable member 64 which is secured with a screw 65, the spit can be turned to rotate the barbecue thereupon. In order to hold such an article when not completely balanced upon the spit I have provided a dog or cleat 66, which, as shown in this latter figure of the drawings, has an upwardly extending end disposed centrally with respect to the slot in the adjustable member 64 so that when the spit 36 with its gear 51 is positioned thereupon the teeth of the gear 51 will register with the dog 66. With this arrangement it will be seen that the spit 36 may be held against inadvertent rotation due to an unbalance of the barbecue thereupon and thus held in any desired position by merely engaging the gear 51 with the dog 66. This will then permit the barbecue to continue with the spit in any position required to provide for a uniform result.

By referring back to Fig. 2 of the drawings it will be noted that the back wall of the housing 10 is also provided with oposed cleats 62 and 63, between which the oven forming means 15 of the unit is adapted to be placed when removed and the parts are folded together. Under these circumstances the cover 17 may then be placed directly upon the housing 10 as a closure for the unit with the other accessories concealed therein.

While I have, for the sake of clearness and in order to disclose the invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a portable barbecue, the combination of a housing having open draft accommodating bottom and a side opening with closure therefor, a charcoal burning fire box insertable through the side opening of said housing, a removable ash pan below said fire box also removable through said side opening, a flash plate extending horizontally above said fire box, a drip pan mounted immediately above said flash plate, and in spaced relation with the side walls of said housing, said flash plate having upwardly extending walls spaced from the walls of said housing and forming a shield for said drip pan, one of said side walls being hinged to permit insertion and removal of said drip pan through the side opening of said housing, a rectangular flue forming member having upwardly extending and inwardly inclined walls secured at its lower end to the walls of said housing for redirecting the heat deflected by said flash plate from said fire box into a restricted central zone of rectangular outline within said housing, a second flue member supported from the top of said housing having downwardly extending and inwardly inclined walls engageable with and forming an extension of said first flue forming member for distributing the heat from the restricted central zone formed by said rectangular flue forming member substantially uniformly over the entire top area of said housing.

2. In a portable oven and barbecue, the combination of a housing having open bottom and a side opening with closure therefor, a charcoal burning fire box insertable through the side opening and supported within said housing, a flash plate disposed centrally in spaced relation above said fire box and from the side walls of said housing, whereby the heat from said fire box will be deflected and circulate around said flash plate, a heat directing flue forming member secured within and extending from the four walls of said housing for redirecting the deflected heat from said fire box into a restricted central zone of rectangular outline below the top of said housing, a grill supporting frame having a downwardly depending funnel forming walls engageable with the upper open end of said flue forming member and forming a continuation thereof for distributing the heat from said restricted central zone of rectangular outline substantially uniformly over the entire top area of said housing, and a food supporting grill carried by said supporting frame encompassing the upper open end of said housing.

3. In a portable barbecue, the combination of a housing having a draft accommodating open bottom and a side opening with closure therefor, a charcoal burning fire box insertable through said side opening and supported above the open bottom of said housing, a heat insulated flash plate disposed centrally above said fire box and in spaced relation with the side walls of said housing, a drip pan mounted in a protected portion above said flash plate, an inwardly tapering flue forming member extending from the walls and secured within said housing and above said drip pan for directing the heat from said fire box into a central zone of rectangular outline at the top of said housing, a grill disposed over and encompassing the entire top area of said housing, and a grill supporting frame having a downwardly depending and inwardly tapering portion engageable with the upper end of said flue forming member for directing drippings from said grill into said drip pan and distributing the heat conducted by said flue substantially uniformly over the entire area of said grill.

References Cited in the file of this patent

UNITED STATES PATENTS

| | | |
|---|---|---|
| 1,051,503 | Klein | Jan. 28, 1913 |
| 1,178,298 | Carlton | Apr. 4, 1916 |
| 2,004,024 | Van Voorst | June 4, 1935 |
| 2,046,352 | Warner | July 7, 1936 |
| 2,154,305 | Goerl | Apr. 11, 1939 |
| 2,485,667 | Sims | Oct. 25, 1949 |
| 2,608,190 | Winning et al. | Aug. 26 1952 |
| 2,626,559 | Rau | Jan. 27, 1953 |